United States Patent [19]
DuRocher et al.

[11] Patent Number: 5,259,262
[45] Date of Patent: Nov. 9, 1993

[54] NON-INVOLUTE GEAR

[75] Inventors: Daniel J. DuRocher, Leonard; Ellsworth S. Miller, Rochester Hills, both of Mich.

[73] Assignee: ITT Corporation, New York, N.Y.

[21] Appl. No.: 887,064

[22] Filed: May 22, 1992

[51] Int. Cl.⁵ .............................................. F16H 55/08
[52] U.S. Cl. ........................................ 74/462; 74/98; 74/484 R; 200/61.54
[58] Field of Search ............... 74/462, 464, 468, 498, 74/98, 484 R; 200/61.54

[56] References Cited

U.S. PATENT DOCUMENTS

| | | | |
|---|---|---|---|
| 1,833,159 | 11/1931 | Garnett | 74/462 |
| 1,853,513 | 4/1932 | Douglas | 200/61.54 |
| 2,306,854 | 12/1942 | Zimmer | 74/462 |
| 3,756,091 | 9/1973 | Miller | 74/462 X R |
| 4,112,782 | 9/1978 | Mullins | 74/462 |

FOREIGN PATENT DOCUMENTS

| | | | |
|---|---|---|---|
| 1099369 | 9/1955 | France | |
| 1-234655 | 9/1989 | Japan | 74/462 |
| 239782 | 11/1945 | Switzerland | 74/462 |
| 1293414 | 2/1987 | U.S.S.R. | 74/462 |

Primary Examiner—Allan D. Herrmann
Assistant Examiner—William O. Trousdell
Attorney, Agent, or Firm—Robert P. Seitter; Gordon J. Lewis

[57] ABSTRACT

A non-involute gear used in a gear pair. A first gear has a plurality of radially extending, circumferentially spaced teeth, each with a generally cylindrical, arcuate shaped end surface. A second gear has a plurality of spaced, non-involute shaped teeth. Each tooth of the second gear is formed with opposed base faces disposed at an identical radius. A pair of flats extend in parallel from the ends of each circular base face and terminate in inwardly extending, end portions extending from the flats to the top land of each gear tooth. A tooth space is formed between two adjacent non-involute gear teeth having a semi-circular base portion formed by the opposed circular base faces of two adjacent gear teeth and two parallel flat portions formed by the pair of parallel flats extending from the semi-circular base portion which combine to form a generally U-shaped space for receiving a gear tooth on the first gear.

16 Claims, 4 Drawing Sheets

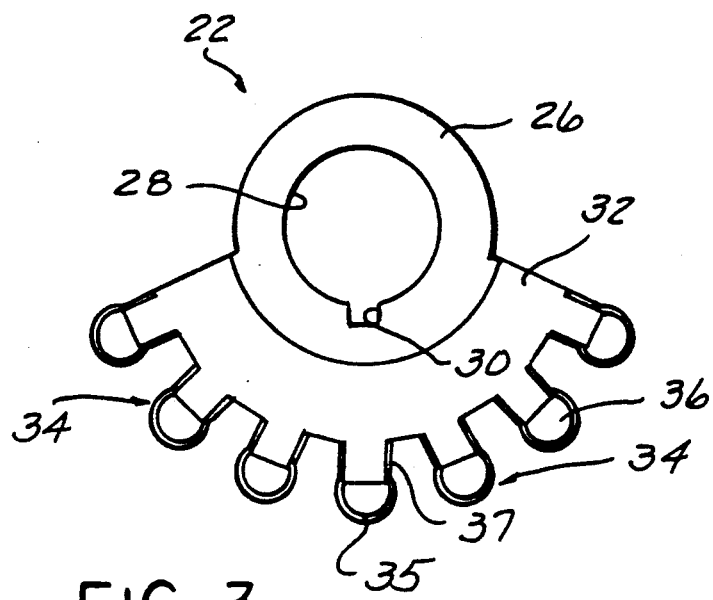
FIG-3
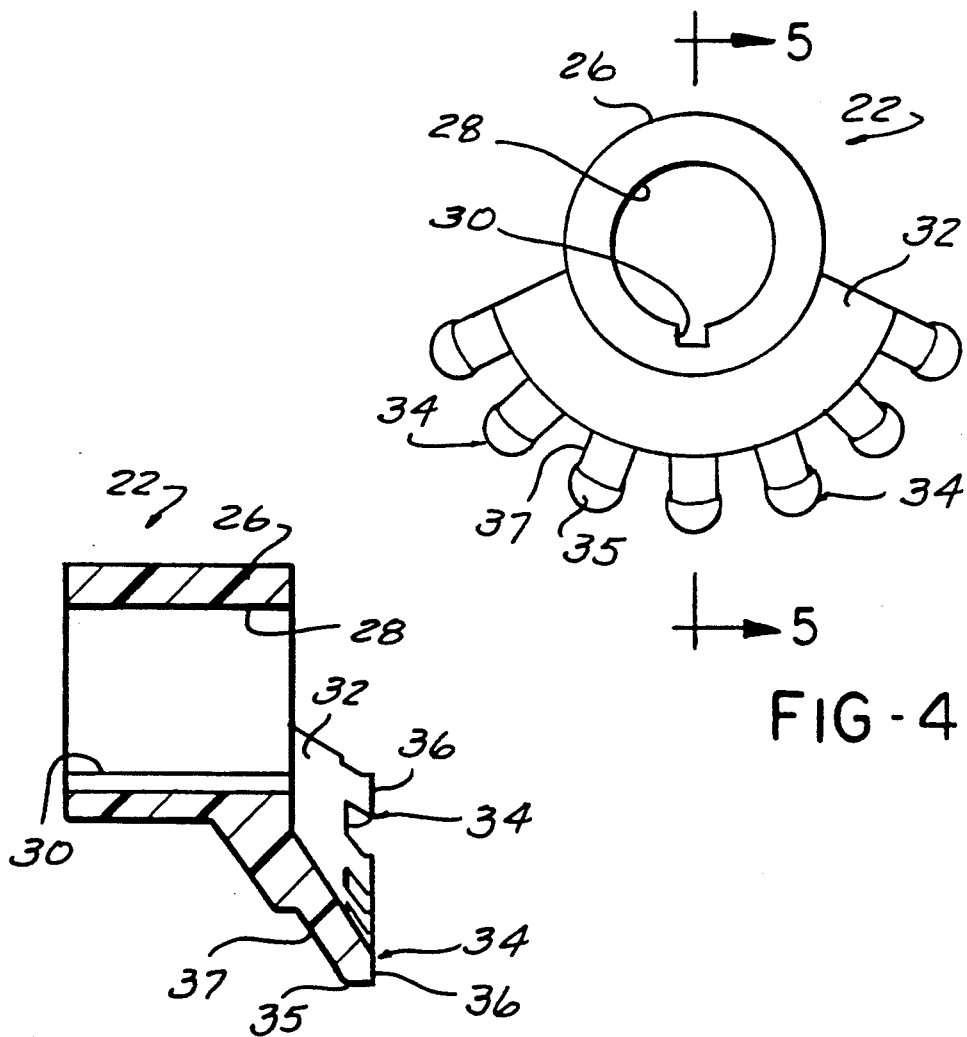
FIG-4
FIG-5

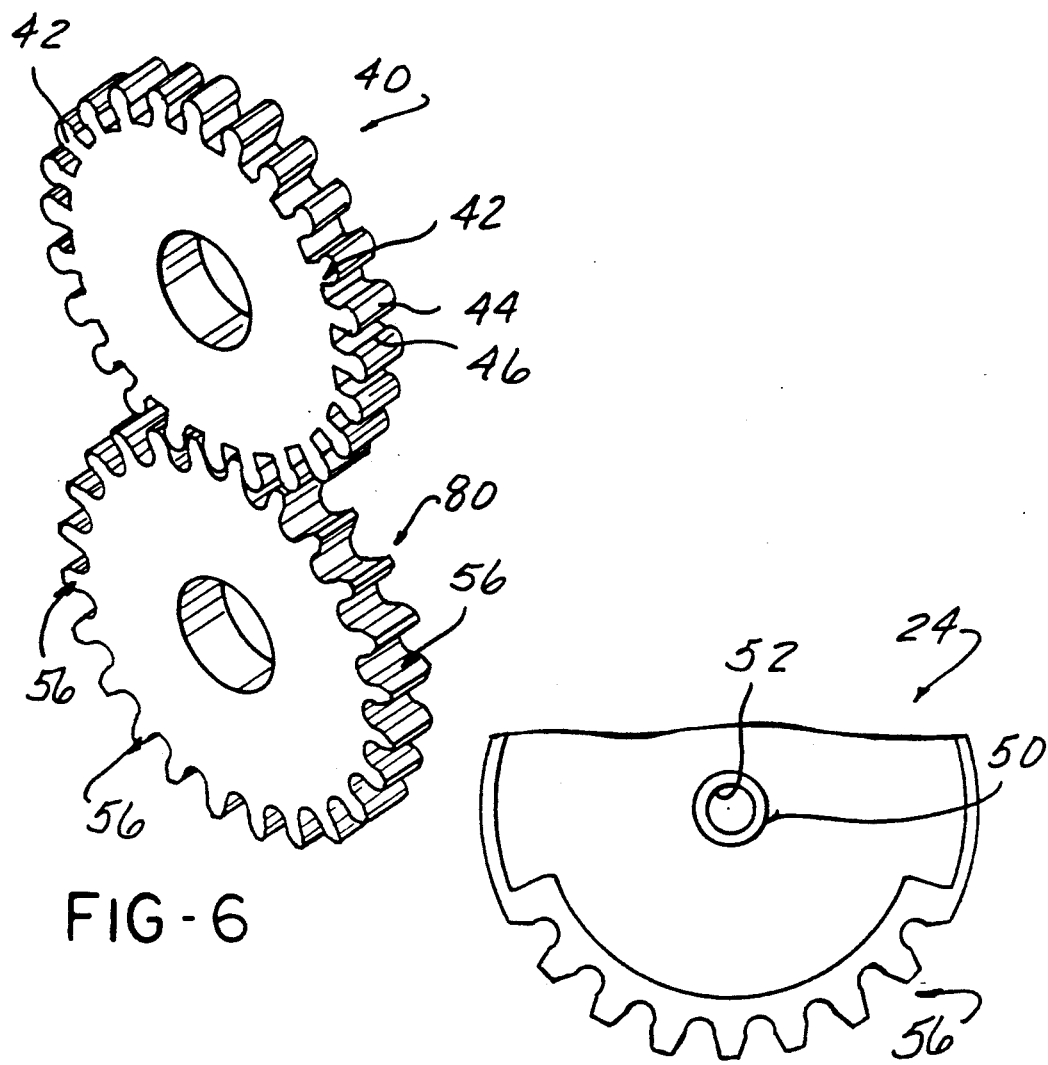
FIG-6
FIG-7
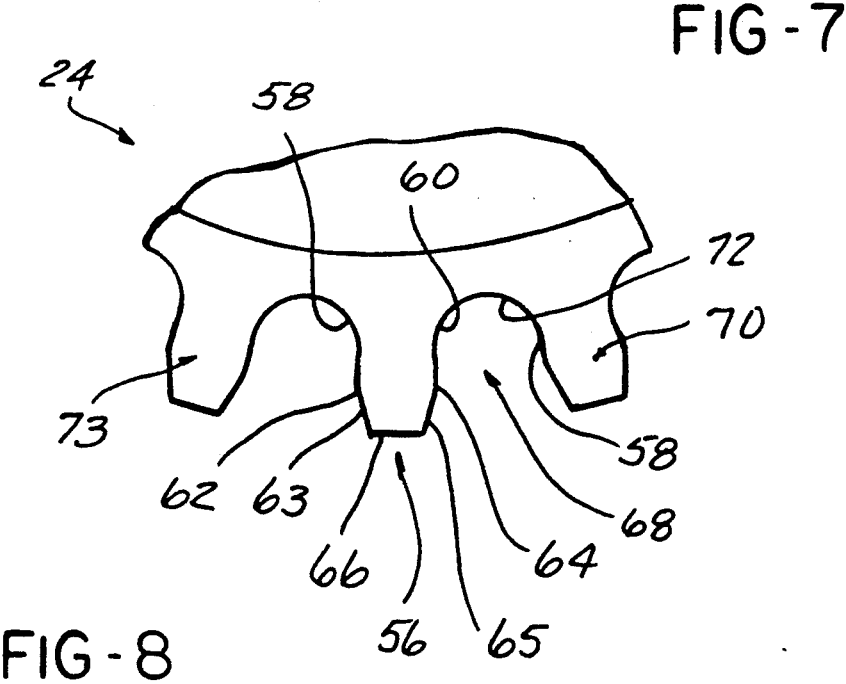
FIG-8

NON-INVOLUTE GEAR

BACKGROUND OF THE INVENTION

1. Field of the Invention

The present invention relates, in general, to gears and, more specifically, to gears employed in low force and low speed applications.

2. Background Description

Gears are used in a wide variety of applications to transmit motion between two spaced, rotating shafts. In spur gears, two gears respectively mounted on parallel shafts are meshed together with one gear acting as the driving gear and the other gear being the driven gear. The teeth of such spur gears typically have an involute form laid out along an involute curve. The use of such involute teeth on gears provides smooth rolling action with minimal sliding between the two meshing gears.

In certain gear applications, the center distance between the two rotating, parallel shafts interconnected by two meshed gears is critical for the efficient transfer of rotation between the shafts. If the center distance is too small, the meshing gear teeth may bind or, at least, generate high friction forces which inhibit the smooth rotation of the gears. Conversely, if the center distance between the two shafts is too large, backlash between the gear teeth of the two meshing gears increases which results in looseness between the gears and non-uniform, jerky action of the gears.

In automotive applications, a multi-function steering column switch apparatus is mounted on the vehicle steering column for controlling various electrical devices in the vehicle depending on the mode or direction of movement of the switch. Such devices include, for example, headlight beams, windshield wiper assembly and turn signals. Such devices are separately activated by pivoting, tilting or rotational movement of the multi-function steering column switch lever. Contacts mounted in the switch housing are connected by a specific movement of the lever to control the activation and deactivation of the connected device.

In such applications, rotation of the end portion of the switch lever is typically used to control the windshield wiper assembly between off, on and a plurality of discrete, intermittent operating speeds. A drive gear mounted on and rotatable with the switch lever engages the involute teeth of a spur gear mounted in the switch housing. The spur gear moves a contact attached thereto between engagement with various fixed contacts mounted in the switch housing to selectively control the operation of the windshield wiper assembly depending upon the degree and direction of rotation of the end portion of the switch lever.

For weight and cost reduction purposes, such a gear pair has been made of plastic. However, the tolerances of plastic gears cannot be held as tight as with similar gears formed of metal, especially in gear stacks. This has resulted in high friction forces and non-smooth operation of the switch lever. This also creates an unfavorable tactile feel to the movement of the switch lever.

Thus, it would be desirable to provide a gear arrangement which overcomes the aforementioned problems with respect to providing smooth gear operation within a wide range of gear shaft center tolerances. It would also be desirable to provide such a gear arrangement which is advantageously useful in automotive applications having low force and low speed requirements. It would also be desirable to provide a gear arrangement which provides a solid, uniform tactile feel to a gear operator lever during operation of the gears.

SUMMARY OF THE INVENTION

The present invention is a non-involute gear for use in a gear pair formed of a first gear and a second gear.

The first gear includes a plurality of radially extending, non-involute, spaced teeth, each of which has a generally spherical, circular cross-section end working surface. The second gear has a plurality of spaced, non-involute shaped teeth. Each tooth of the second gear is formed with opposed base faces disposed at identical, constant radii from centers located in the tooth spaces on either side of each non-involute gear tooth. A pair of flats extend from the ends of each arcuate base face for a predetermined distance. Inwardly extending cutouts extend from the ends of each of the flats to the top land of each tooth. The flats and the constant radius base faces of two adjacent teeth on the second gear form a generally U-shaped tooth space between two adjacent teeth. The top land of the first gear engages the circular base faces and the flats of the tooth space between two adjacent teeth on the second gear.

In an operating gear pair, either of the first or second gears may be the drive gear, with the other gear acting as the driven gear.

The first and second gears may be formed in either complete gears containing gear teeth extending around the entire periphery of each gear; or as meshing sector gears providing a limited degree of rotational movement between the two meshed gears.

The gear arrangement of the present invention provides significant advantages, particularly in low force and low speed applications, such as, for example, in vehicle steering column lever controlled switches. By use of the non-involute gear of the present invention itself or in combination with another gear having non-involute, arcuate shaped teeth ends, a gear pair may be constructed for use over a wide range of gear center tolerances with smooth operation of the meshed gears throughout the entire gear operating range.

BRIEF DESCRIPTION OF THE DRAWING

The various features, advantages and other uses of the present invention will become more apparent by referring to the following detailed description and drawing in which:

FIG. 3 is a front view of the first gear shown in FIG. 2;

FIG. 4 is a back view of the first gear shown in FIG. 2;

FIG. 5 is a cross sectional view generally taken along line 5—5 in FIG. 4;

FIG. 6 is a perspective view of an alternate embodiment of a gear pair constructed in accordance with the present invention;

FIG. 7 is an enlarged, partial front elevational view of the second gear shown in FIG. 2;

FIG. 8 is a further enlarged view showing the construction of the gear teeth of the second gear shown in FIG. 7;

FIGS. 9A, 9B and 9C are front elevational views depicting the positional relationships between the first and second gears of the present invention during start, ¼ tooth and ½ tooth rotational movements, at a minimal gear center dimension.

DESCRIPTION OF THE PREFERRED EMBODIMENTS

Figure 1:
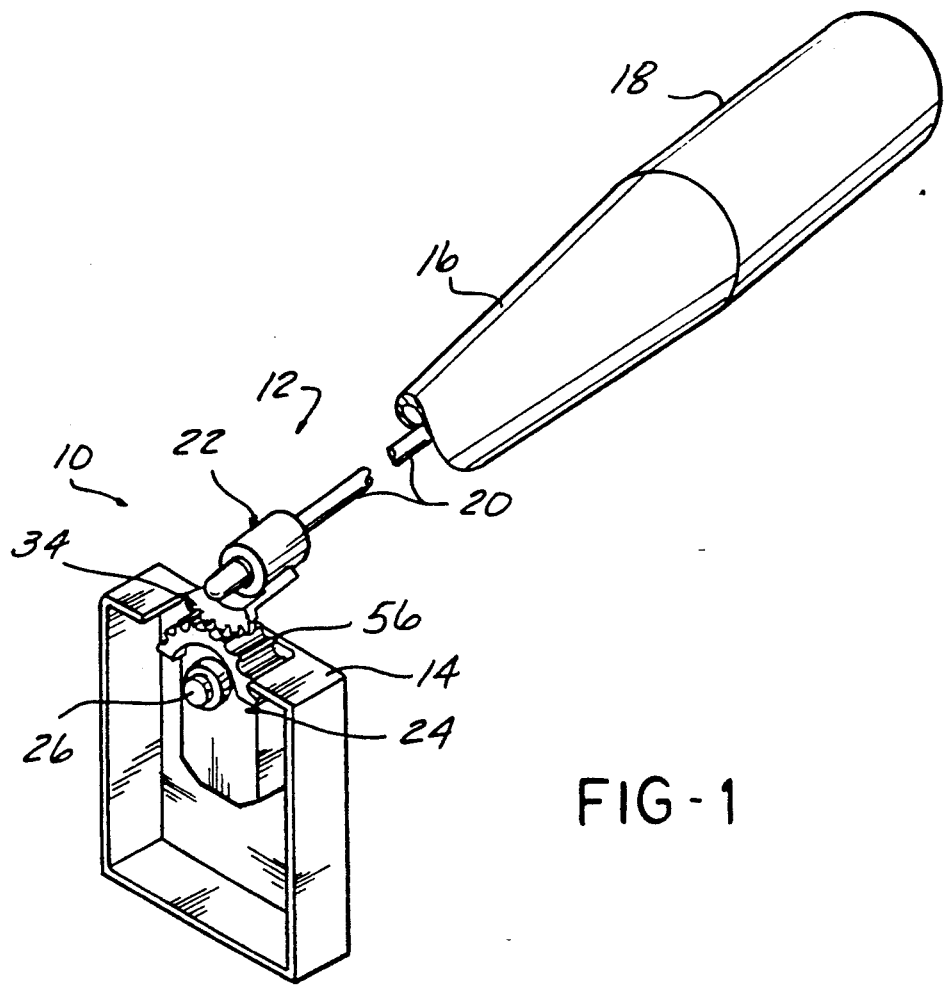
FIG. 1 is a partial, perspective view of an automotive multi-function steering column switch assembly utilizing the non-involute gear and gear pair of the present invention.
Figure 2:
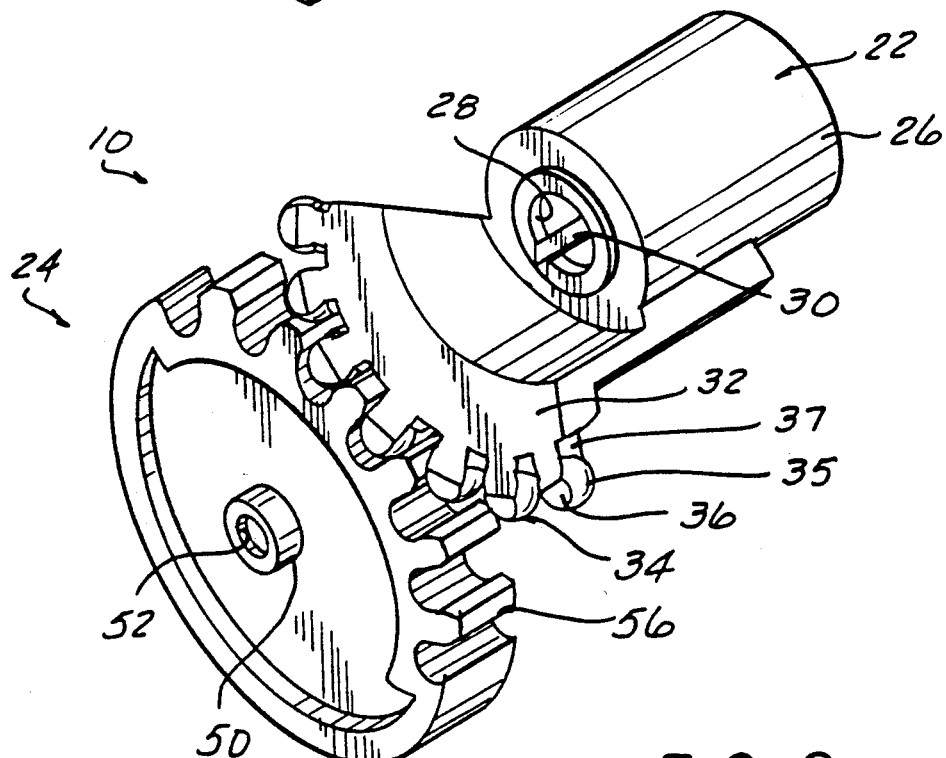
FIG. 2 is a perspective view of the gear pair of the present invention.

Referring now to the drawing, and to FIGS. 1 and 2 in particular, there is illustrated a gear pair 10 for transmitting rotational movement between two rotatable shafts. FIG. 1 depicts the gear pair 10 of the present invention as employed in an automotive multi-function steering column switch assembly 12. It will be understood that the gear pair 10 may also be employed in other applications, particularly applications involving low force and low rotational speeds.

The gear pair 10 of the present invention is useable over a wide range of gear shaft center-to-center distances. Further, the gear pair 10 is operable when the axes of rotation of the gears are parallel, misaligned, skewed or non-parallel.

By way of example only, a portion of a multi-function steering column switch assembly 12 is shown in FIG. 1. Such an assembly 12 includes a housing 14 which is fixedly mounted to a vehicle steering column in proximity with the steering wheel. A lever 16 extends outward from the housing 14 and is oriented generally perpendicular to the longitudinal axis of the steering column. Further details concerning the construction of the multi-function switch assembly 12 and its mounting on an automotive vehicle steering column may be had by referring to U.S. Pat. No. 5,049,706, issued Sep. 17, 1991. The relevant portions of this patent pertaining to the construction, mounting and use of the multi-function steering switch assembly are incorporated herein by reference.

Typically, the switch lever 16 is mounted at a first end to the housing 14 for movement in three different modes or planes of operation. The lever 16 may be pivoted in one plane about the first end, pivoted in a second plane, generally perpendicular to the first plane, and at least an end portion of the lever 16 is rotatable about the longitudinal axis of the lever 16. By way of example only, the gear pair 10 of the present invention is employed with rotation of an end cap or portion 18 of the switch lever 16. The rotatable end portion 18 is fixedly mounted at one end of a rotatable shaft 20 which extends longitudinally through the switch lever 16 into the interior of the switch housing 14.

As described in greater detail hereafter, the gear pair 10 of the present invention includes a first or drive gear 22 fixedly mounted on and rotatable with the shaft 20 and a second or driven gear 24 rotatably mounted about a shaft 26 fixed within the switch housing 14. As used hereafter, the terms "drive gear" and "driven gear" are applied respectively to the first gear 22 and the second gear 24. However, it will be understood that either gear 22 or 24 may be employed as the drive gear, with the other gear operating as the driven gear. Further, the specific constructions of each of the gears 22 and 24 described hereafter may also be used on the other gear of each gear pair.

A moveable electrical contact, not shown, is mounted on the driven gear 24 and moves between selected positions wherein it makes contact with various stationary contacts, also not shown, mounted in the switch housing 14 to control a device, such as a vehicle windshield wiper assembly, between off, on and a plurality of discrete, intermittent operating positions.

Referring now to FIGS. 1-5, the drive gear 22 is constructed for use in the above-described multi-function steering column switch 12. Thus, in this application, the drive gear 22 is movable with the lever 16 along three different axes. For other applications, different constructions for the drive gear 22 may be provided, all falling within the scope of the present invention.

The drive gear 22 includes a collar 26 having a generally cylindrical shape. A bore 28 extends through the collar 26 for passage of the steering column switch assembly shaft 20 therethrough, as shown in FIG. 1. A key 30 is formed in the collar 26 for fixedly securing the collar 26 to the rotatable shaft 20.

A conical-shaped surface 32 is integrally formed with and extends angularly outward from the collar 22. The conical-shaped surface 32 is employed, by way of example only, to provide space at the end of the drive gear 22 for various components and wiring employed in the steering column switch assembly 12. A solid, generally planar surface could also be employed on the drive gear 22.

A plurality of circumferentially spaced teeth, all denoted in general by reference number 34, are formed on and extend radially outward from the end of the conical surface 32. The number of teeth 34 as well as the circumferential extent of such teeth 34 may be provided as needed for the requirements of a particular application. Thus, the depiction of seven teeth 34 arranged in a sector gear arrangement on the drive gear 22 will be understood as being by way of example only.

In the disclosed application shown in FIG. 1 for a vehicle multi-function steering column assembly 12, the end 35 of each tooth 34 on the drive gear 22 has a generally spherical ball shape on a stem 37 extending from the conical-shaped surface. A flat denoted by reference number 36 is formed on the end 35 of each tooth 34 to remove material from a non gear engaging surface of each tooth 34.

FIG. 6 depicts an alternate embodiment of a drive gear which may be used in the gear pair 10 of the present invention. In this embodiment, the drive gear 40 has a generally circular shape with a plurality of teeth 42 radially extending therefrom. The number of teeth 42 and the circumferential extent of such teeth 42 on the gear 40 may be varied as desired between a small number of teeth extending over a limited portion or sector of the drive gear 40 to a full gear containing teeth 42 extending around the entire periphery of the drive gear 40, as shown in FIG. 6. Each tooth 42 on the gear 40 shown in FIG. 6 has a cylindrical shape with an arcuate end portion 44 on a stem 46 so as to present an arcuate face toward the meshing driven gear, as described hereafter.

The drive gear 22 or 40 and the driven gear 24 or 80 may be formed of any suitable material, such as a plastic, i.e., reinforced nylon, acetal resin, etc. The drive and driven gears may also be formed of a powdered metal.

As shown in FIG. 2, and in greater detail in FIGS. 7 and 8, the driven gear 24 is disposed in meshing engagement with either of the drive gears 22 or 40. The driven gear 24 is a generally planar member having a centrally located hub 50 with a bore 52 extending therethrough. The bore 52 is fixedly mounted to the rotatable shaft 26 in the switch housing 14.

A plurality of circumferentially spaced, radially extending teeth 56 are formed on the periphery of the driven gear 24. The number and circumferential extent of the teeth 56 may be selected as needed for the requirements of a particular application. Thus, the depiction of seven teeth 56 arranged in a sector gear arrangement on the driven gear 24 will be understood as being by way of example only as different numbers of teeth 56 may also be employed.

Each gear tooth 56 on the driven gear 24 has a generally non-involute shape formed by first and second opposed, circular base portions 58 and 60 formed on opposite base flanks of each gear tooth 56. The circular portions 58 and 60 have identical radii from centers located in the tooth spaces adjacent to each gear teeth 56. First and second flats 62 and 64 extend from the radial outermost ends of the circular portions 58 and 60, respectively, and are arranged in parallel with each other. The radial outermost ends 63 and 65 of each gear tooth 56 taper angularly inward from the ends of the flats 62 and 64 to a generally flat top land 66.

As each of the gear teeth 56 are identically constructed, a tooth space denoted in general by reference number 68 in FIG. 8 is formed between two adjacent gear teeth, such as gear teeth 56 and 70, having a constant radius base 72, a pair of parallel, flat portions formed by the flats 62 and 64 on the adjacent gear teeth 56 and 70 and outwardly extending end portions formed by the angular faces 63 and 65 on the outer ends of each of the gear teeth 56 and 70. The circular base portion 72 and the parallel flats 62 and 64 of two adjacent gear teeth form a generally U-shaped tooth space 68 for receiving the spherical or cylindrical end portion of the teeth 34 of the drive gear 22, as described hereafter.

The use of the inwardly tapering end portions 63 and 65 on each tooth, such as gear tooth 56, and the angular arrangement of each tapered portion 63 and 65 with the adjacent flats 62 and 64, respectively, provides clearance for the cylindrical end portion of each gear tooth 34 on the drive gear 22 during meshing rotation of the drive gear 22 and the driven gear 24. Other angles for such tapered surfaces may be employed as needed for the requirements of a particular application.

The parallel flats 62 and 64 on each gear tooth 56, 70, etc., extend the range of permissible center-to-center gear shaft dimensions between the drive and driven gears 22 and 24 respectively, through which the gear pair 10 of the present invention is efficiently operable. Such a range of permissible center-to-center dimensions is shown in FIGS. 9A, 9B, 9C, 10A, 10B and 10C.

Another embodiment of a driven gear 80 is shown in FIG. 6 in meshed engagement with the drive gear 40. The driven gear 80 is similar to driven gear 24 in that it includes a plurality of gear teeth 56 having a non-involute shape as described above. However, in this embodiment, the gear teeth 56 extend over the entire periphery of the driven gear 80 to mesh with the full drive gear 40. It will be understood that either of the gears 40 and 80 shown in FIG. 6 may be connected to the shaft 20 to act as the drive gear of the gear pair, with the other gear then acting as the driven gear. Further, the non-involute gear teeth configuration described above for gear 24 may also be employed on the end of a conical-shaped surface as on the drive gear 20.

Figure 9A:
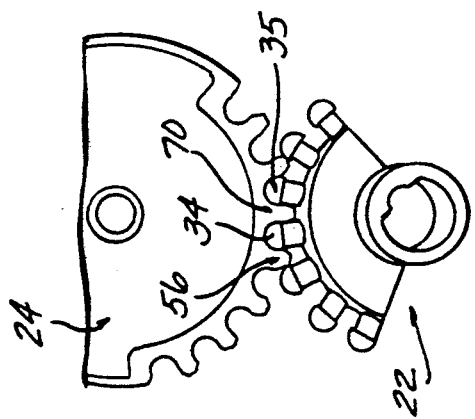

FIG. 9A depicts the drive gear 22 in meshed engagement with the gear teeth of the driven gear 24 at a stationary, start position. In this position, one gear tooth 34 of the drive gear 22 is fully engaged in the U-shaped tooth space 68 formed between two adjacent gear teeth 56 and 72 on the driven gear 24. The spherical end of each gear tooth 34 is freely rollable through the U-shaped tooth space 68 on the driven gear 24 at the minimum center-to-center dimension between the centers or shafts of the drive gear 22 and the driven gear 24.

Figure 9B:
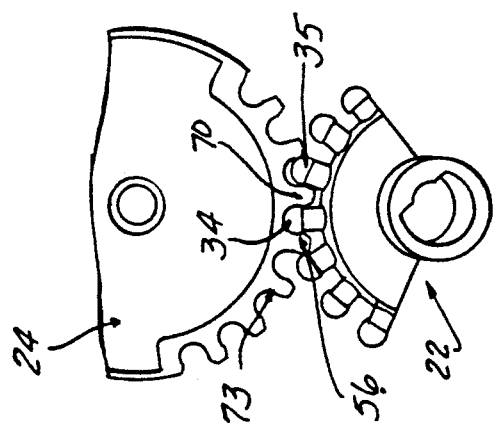

FIG. 9B depicts the positions of the gears 22 and 24 after a ¼ tooth rotation of the drive gear 22 in a counterclockwise direction. In this position, the gear tooth 34 is substantially fully engaged in the tooth space 68 between the adjacent gear teeth 56 and 70 on the driven gear 24. However, the adjacent gear tooth 35 on the drive gear 22 has moved into initial engagement with the flat 64 on the gear tooth 70 of the driven gear 24. Further rotation of the drive gear 22 to a ½ tooth rotation position shown in FIG. 9C will rotate the driven gear 24 in a clockwise direction. In this position, the gear tooth 35 on the drive gear 22 is now substantially fully in a tooth space 68 between two adjacent teeth 56 and 70 on the driven gear tooth 34; while the adjacent gear 34 is beginning to pull out of the adjacent tooth space 68. However, the gear teeth 34 and 35 on the drive gear 22 are freely moveable with respect to the teeth on the driven gear 24 despite the minimum center-to-center clearance between the drive and driven gears 22 and 24, respectively.

Figure 10C:
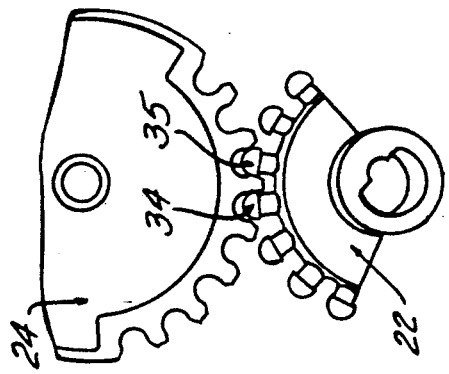
FIGS. 10A, 10B and 10C are front elevational views depicting the first and second gears during start, ¼ tooth and ½ tooth rotational movements at a maximum gear center dimension.
Figure 10B:
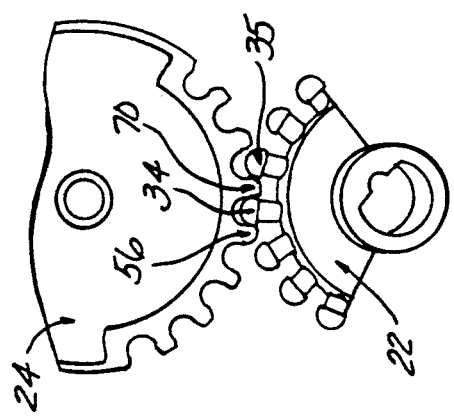
Figure 9A:
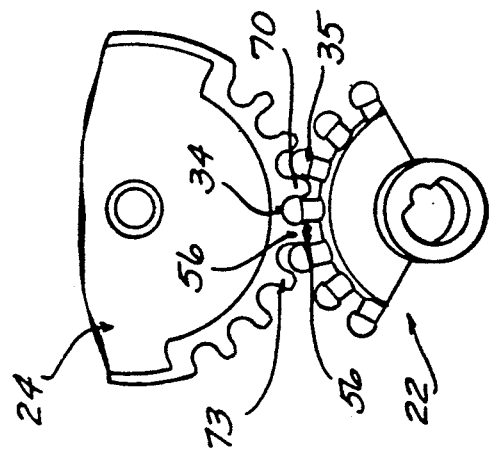
Figure 10A:
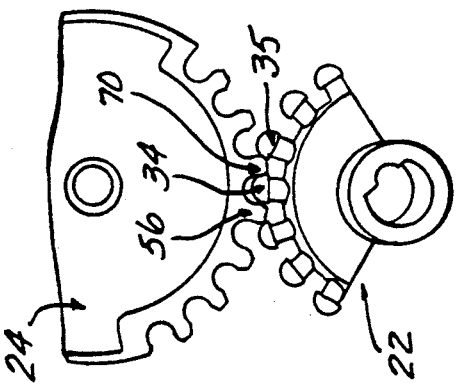

FIG. 10A depicts an initial, stationary start position for the drive gear 22 and the driven gear 24 at a maximum center-to-center tolerance or clearance. In this position, the tooth 34 on the drive gear 22 is shown at a minimal engagement position with a tooth space 68 on the driven gear 24. In this position, the spherical end of the gear tooth 34 on the drive gear 22 engages the flats 62 and 64 on two adjacent gear teeth 56 and 70 on the driven gear 24. During a ¼ tooth rotation of the drive gear 22 in a counterclockwise direction, as shown in FIG. 10B, the gear tooth 34 remains substantially engaged with the flats of two adjacent gear teeth 56 and 70 on the driven gear 24. The adjacent gear tooth 35 on the drive gear 22 has now come into initial contact with one of the flats 64 on the gear tooth 70 thereby maintaining constant meshing engagement between the drive gear 22 and the driven gear 24. Further rotation of the drive gear 22 for a full ½ tooth rotation in a counterclockwise direction, as shown in FIG. 10C, brings the gear tooth 34 partially out of a tooth space 68 in the driven gear 24; while the adjacent drive gear tooth 35 is more fully engaged with the two gear teeth in the adjacent tooth space 68 on the driven gear 24.

Thus, the gear pair and the unique non-involute gear of the present invention affords smooth, efficient contact between the gear teeth of two meshed gears over a wider center-to-center dimension between the spaced gear shafts. This enables low cost, lightweight plastic material to be used to form such gears, while providing smooth gear meshing engagement in low force, low rotational speed applications.

What is claimed is:

1. A non-involute gear comprising:
   an annular body in the form of a collar;
   a conical surface extending radially and longitudinally from one end of the collar; and a plurality of circumferentially spaced, radially extending teeth formed on an outer end of the conical surface, each tooth including:
opposed arcuate base faces, each disposed at a constant radius from a center in a tooth space adjacent to each tooth;
a pair of parallel flats, each extending respectively from a radially outermost end of a base face;
end portions extending from the flats, respectively, angularly inward to a top land of each tooth; and
a tooth space formed between two adjacent gear teeth having a circular base portion formed as a semi-circle by two opposed arcuate base faces on two adjacent gear teeth and two parallel flat portions extending from the semi-circular base portion to form a generally U-shaped space between two adjacent teeth.

2. The non-involute gear of claim 1 wherein the body is formed of plastic.

3. The gear pair of claim 1 wherein the teeth extend over a limited angular extent of the circumference of the end of the conical surface.

4. A gear pair comprising:
a first gear having a plurality of circumferentially spaced teeth extending radially therefrom, each tooth on the first gear having a stem portion and an enlarged arcuate end portion with a substantially spherical end shape;
a second gear having a plurality of non-involute teeth circumferentially spaced and radially extending therefrom, each gear tooth on the second gear including:
opposed, arcuate base faces, each disposed at a constant radius from a center in a tooth space adjacent to each tooth;
a pair of parallel flats, each extending respectively from a radially outermost end of a base face;
end portions extending angularly inward from the flats, respectively, to a top land of each tooth; and
a tooth space formed between two adjacent gear teeth on the second gear having a semi-circular base portion formed by two opposed arcuate base faces on two adjacent teeth and two parallel flat portions extending from the ends of the semi-circular base portion, respectively, to form a generally U-shaped space between two adjacent gear teeth on the second gear for meshingly receiving a gear tooth of the first gear therein.

5. The non-involute gear of claim 4 wherein the body comprises:
a planar, annular member; and
the plurality of teeth are formed on the periphery of the planar, annular member.

6. The gear pair of claim 4 wherein the end of each tooth on the first gear has a substantially circular cross-section.

7. The gear pair of claim 4 wherein the first and second gears are formed of plastic.

8. The gear pair of claim 4 wherein the first gear comprises:
a collar;
a conical surface extending radially and longitudinally from one end of the collar; and
the plurality of teeth formed on an outer end of the conical surface.

9. The gear pair of claim 8 wherein the teeth extend over a limited angular extent of the circumference of the end of the conical surface.

10. The gear pair of claim 4 wherein the first gear comprises:
a planar, annular member; and
the plurality of teeth are formed on the periphery of the planar, annular member.

11. The gear pair of claim 10 wherein the end of each tooth on the first gear has a substantially circular cross-section.

12. The gear pair of claim 10 wherein the teeth extend for a limited angular extent of the circumference of the planar, annular member.

13. A steering column switch apparatus for a vehicle having a steering column and at least one electrically energizable device, the apparatus comprising:
a housing mountable on a steering column of a vehicle;
a switch lever mounted on the housing and exhibiting at least rotational movement with respect to the housing;
a drive gear, mounted in the housing and connected to one end of the switch lever and rotatable with the switch lever, the drive gear having a plurality of circumferentially spaced teeth extending radially therefrom, the drive gear including a collar and a conical surface extending radially and longitudinally from one end of the collar, the plurality of teeth being formed on an outer end of the conical surface, each tooth on the drive gear having a substantially spherical end shape;
a driven gear rotatably mounted in the housing, the driven gear having a plurality of non-involute teeth circumferentially spaced and radially extending therefrom;
each gear tooth on the driven gear including:
opposed, arcuate base faces, each disposed at a constant radius from a center in a tooth space adjacent to each tooth;
a pair of parallel flats, each extending respectively from a radially outermost end of a base face; and
end portions extending angularly inward from the flats, respectively, to a top land of each tooth;
a tooth space formed between two adjacent gear teeth having a semi-circular base portion formed by two opposed arcuate base faces on two adjacent teeth and two parallel flat portions formed by a pair of parallel flats extending from the ends of the semi-circular base portion, respectively, to form a generally U-shaped space between two adjacent gear teeth for meshingly receiving a gear tooth of the drive gear therein; and
an electrical contact mounted on and rotatable with the driven gear, the contact being movable between a plurality of positions upon rotation of the driven gear for selectively engaging a plurality of stationary contacts mounted in the housing to energize at least one electrically energizable device.

14. The apparatus of claim 13 wherein the drive gear and the driven gear are formed of plastic.

15. The apparatus of claim 13 wherein the teeth on each of the drive gear and the driven gear extend over a limited angular extent of the circumference of the drive gear and the driven gear.

16. A steering column switch apparatus for a vehicle having a steering column and at least one electrically energizable device, the apparatus comprising:

a housing mountable on a steering column of a vehicle;

a switch lever mounted on the housing and exhibiting at least rotational movement with respect to the housing;

a drive gear, mounted in the housing and connected to one end of the switch lever and rotatable with the switch lever, the drive gear having a plurality of circumferentially spaced teeth extending radially therefrom;

a driven gear rotatably mounted in the housing, the driven gear having a plurality of non-involute teeth circumferentially spaced and radially extending therefrom;

the drive gear and the driven gear each formed of planar annular members;

each gear tooth on one of the drive and driven gears having a stem portion and an enlarged arcuate end portion with a substantially spherical end shape;

each gear tooth on the other of the drive and driven gears having a non-involute tooth form including:

opposed, arcuate base faces, each disposed at a constant radius from a center in a tooth space adjacent to each tooth;

a pair of parallel flats, each extending respectively from a radially outermost end of a base face; and end portions extending angularly inward from the flats, respectively, to a top land of each tooth;

a tooth space formed between two adjacent gear teeth having a semi-circular base portion formed by two opposed arcuate base faces on two adjacent teeth and two parallel flat portions formed by the pair of parallel flats extending from the ends of the semi-circular base portion, respectively, to form a generally U-shaped space between two adjacent gear teeth for meshingly receiving a gear tooth of the one of the drive and driven gears therein; and an electrical contact mounted on and rotatable with the driven gear, the contact being movable between a plurality of positions upon rotation of the driven gear for selectively engaging a plurality of stationary contacts mounted in the housing to energize at least one electrically energizable device.

* * * * *